US012662401B2

(12) United States Patent
Lee et al.

(10) Patent No.: US 12,662,401 B2
(45) Date of Patent: Jun. 23, 2026

(54) HYBRID ELECTRODIALYSIS AND ELECTROLYSIS SYSTEMS AND PROCESSES

(71) Applicants:PANI CLEAN, INC., Coralville, IA (US); University of Iowa Research Foundation, Iowa City, IA (US)

(72) Inventors: Joun Lee, Coralville, IA (US); Timothy Alan Young, Santa Barbara, CA (US)

(73) Assignee: PANI CLEAN, INC., Coralville, IA (US)

( * ) Notice: Subject to any disclaimer, the term of this patent is extended or adjusted under 35 U.S.C. 154(b) by 152 days.

(21) Appl. No.: 17/345,982

(22) Filed: Jun. 11, 2021

(65) Prior Publication Data

US 2021/0387874 A1 Dec. 16, 2021

Related U.S. Application Data

(60) Provisional application No. 63/038,625, filed on Jun. 12, 2020.

(51) Int. Cl.
*C02F 1/469* (2023.01)
*B01D 61/42* (2006.01)
(Continued)

(52) U.S. Cl.
CPC .......... *C02F 1/4693* (2013.01); *B01D 61/422* (2013.01); *B01D 61/463* (2022.08);
(Continued)

(58) Field of Classification Search
CPC ...... C02F 1/4693; C02F 1/4695; C02F 1/461; C02F 2101/163; C02F 2209/15
See application file for complete search history.

(56) References Cited

U.S. PATENT DOCUMENTS 4,179,348 A * 12/1979 Bernat .................. C02F 1/4672
210/904
4,312,722 A * 1/1982 Yoshida .................... C25B 1/14
204/252
(Continued)

FOREIGN PATENT DOCUMENTS

WO WO-0034184 A1 * 6/2000 .......... C02F 1/46104

OTHER PUBLICATIONS

Ghodbane et al, "Electrochemical Reduction of Nitrate on Pyrolytic Graphite-Supported Cu and Pd—Cu Electrocatalysts", Apr. 17, 2008, Journal of the Electrochemical Society, 155, F117-F123. (Year: 2008).*

(Continued)

*Primary Examiner* — Luan V Van
*Assistant Examiner* — Andrew Koltonow
(74) *Attorney, Agent, or Firm* — Lando & Anastasi, LLP

(57) ABSTRACT

Disclosed are systems and processes for the removal and conversion of pollutants in water. A system includes a set of electrodes with at least one electrode having an integrated catalyst material. The system is operatable in a first, electrodialysis mode in which one or more pollutants are separated from a feedwater stream, and a second electrolysis mode in which the separated pollutant(s) are catalytically converted into benign products by way of the catalyst material of the electrode. Electrodialysis and electrolysis are therefore carried out using the same unit.

3 Claims, 8 Drawing Sheets

(51) Int. Cl.

| | |
|---|---|
| *B01D 61/46* | (2006.01) |
| *B01D 61/52* | (2006.01) |
| *C02F 1/461* | (2023.01) |
| *C02F 1/467* | (2023.01) |
| *C02F 101/16* | (2006.01) |
| *C02F 103/00* | (2006.01) |

(52) U.S. Cl.

CPC .......... *B01D 61/52* (2013.01); *C02F 1/46109* (2013.01); *C02F 1/4676* (2013.01); *B01D 2311/2684* (2013.01); *B01D 2313/345* (2013.01); *C02F 2001/46142* (2013.01); *C02F 2101/163* (2013.01); *C02F 2103/001* (2013.01); *C02F 2201/46115* (2013.01)

(56) References Cited

U.S. PATENT DOCUMENTS

| | | | | |
|---|---|---|---|---|
| 5,094,732 | A * | 3/1992 | Oldani | B01D 61/44 |
| | | | | 204/539 |
| 5,306,400 | A * | 4/1994 | Bradbury | C02F 1/467 |
| | | | | 205/617 |
| 6,083,377 | A * | 7/2000 | Lin | C02F 1/008 |
| | | | | 205/745 |
| 8,491,771 | B2 | 7/2013 | Sano | |
| 9,340,437 | B2 | 5/2016 | Andersen | |
| 2002/0167782 | A1 * | 11/2002 | Andelman | C02F 1/008 |
| | | | | 361/302 |
| 2009/0127194 | A1 * | 5/2009 | Joo | B01D 61/44 |
| | | | | 210/638 |
| 2009/0159460 | A1 | 6/2009 | Du et al. | |
| 2011/0042219 | A1 | 2/2011 | Wei et al. | |
| 2011/0117395 | A1 | 5/2011 | Roodenburg | |
| 2016/0271562 | A1 * | 9/2016 | Sparrow | B01D 1/00 |

OTHER PUBLICATIONS

Hu et al, "Nitrate electro-sorption/reduction in capacitive deionization using a novel Pd/NiAl-layered metal oxide film electrode", Nov. 4, 2017, Chemical Engineering Journal, 335, 475-482. (Year: 2017).*

Bouhadana et al, "A control system for operating and investigating reactors: The demonstration of parasitic reactions in the water desalination by capacitive de-ionization", Nov. 13, 2010, Desalination, vol. 268, p. 235-261. (Year: 2010).*

International Preliminary Report on Patentability received for PCT Patent Application No. PCT/US2021/037105, mailed on Dec. 22, 2022, 10 pages.

International Search Report and Written Opinion received for PCT Patent Application No. PCT/US21/37105, mailed on Nov. 23, 2021, 14 pages.

Invitation to Pay Additional Fees received for PCT Patent Application No. PCT/US21/37105, mailed on Aug. 20, 2021, 2 pages.

Peng et al., "Recovery of copper and water from copper-electroplating wastewater by the combination process of electrolysis and electrodialysis"; vol. 189, Issue 3 (May 2011), p. 814-820.

* cited by examiner

100

100

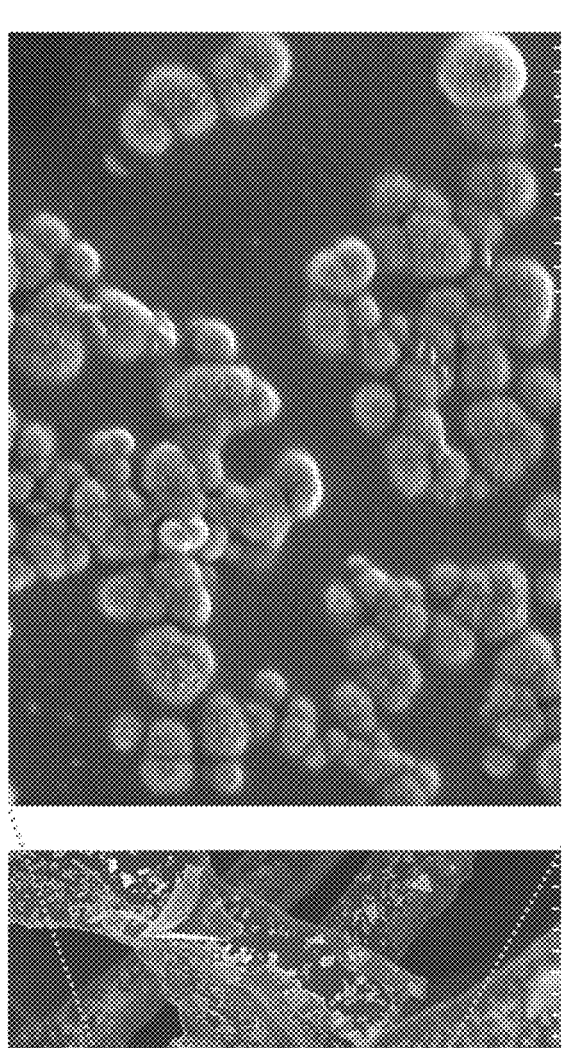
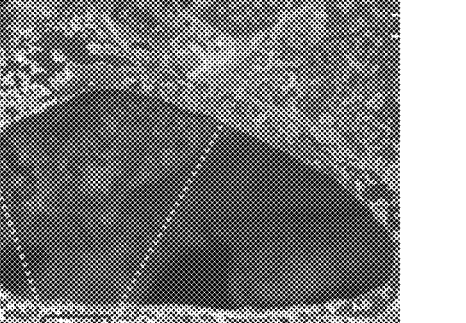
*FIG. 3B*
*FIG. 3A*

HYBRID ELECTRODIALYSIS AND ELECTROLYSIS SYSTEMS AND PROCESSES

CROSS-REFERENCE TO RELATED APPLICATIONS

This application claims priority to and the benefit of U.S. Provisional Patent Application Ser. No. 63/038,625, filed Jun. 12, 2020, the entirety of which is incorporated herein by this reference.

STATEMENT REGARDING FEDERALLY SPONSORED RESEARCH

This invention was made with government support under grant no. 2019-33610-29769 awarded by the United States Department of Agriculture, National Institute of Food and Agriculture. The government has certain rights in the invention.

BACKGROUND

Removal of pollutants from waters presents unique scientific, environmental and economic challenges. In the case of nitrate, currently, the US Environmental Protection Agency (EPA) lists ion-exchange resin (IX), reverse osmosis (RO) and electrodialysis (ED) as the state-of-the-art technologies for removal from waters. All the foregoing technologies produce highly concentrated brine residuals and are limited by expensive brine disposal and management requirements. Current options for brine disposal and management include evaporation in aeration ponds, deep well injection, direct release to sewers, and piping into oceans.

Brine disposal adds extra costs to the process of treating drinking water. For example, evaporation ponds for holding brines require substantially high maintenance costs and land usage. Injection wells can be a lower cost option, but their use raises environmental concerns. Moreover, environmental concerns are leading to tighter restrictions on surface and ocean releases of brine, and disposal costs are expected to rise accordingly.

Currently, IX and RO are the most common approaches for nitrate removal. However, for IX technologies, the possibility of competitive adsorption and the inefficient and energy-intensive regeneration processes have limited widespread adoption. For example, concentrated brine solutions used to regenerate spent resins are disposed after a single use, requiring ~6 g of salt per gallon of water treated. Such salt use can represent more than 70% of the financial burden, and more than 83% of the environmental impact, of adsorption-based processes.

For RO, a major limitation is the freshwater recovery rate. Typically, the freshwater recovery rate is approximately 50%-65%. In other words, 35%-50% of the output is concentrated brine. ED, on the other hand, offers higher water recovery rates (>85%). However, ED processes are limited by high capital and energy costs.

All the foregoing technologies suffer from brine disposal issues. For inland areas in particular, where cost-effective concentrate management options are not available, safe disposal of large volumes of concentrated brines impacts operation costs significantly. Biological denitrification, on the other hand, avoids brine management issues. However, current biological denitrification processes are limited by long start-up times, long recovery times, required posttreatment processes to remove biological sludge, high relative temperature sensitivity, and high physical footprint requirements.

Accordingly, there remains an ongoing need for systems and methods capable of effectively removing unwanted pollutants, such as nitrate, from water while minimizing or avoiding brine management issues associated with the current state of the art.

SUMMARY

Embodiments described herein include systems and processes for the removal of pollutants from water and their conversion to less harmful products. Certain embodiments are directed to systems configured to provide bi-functional operation in which (1) a first polarity provides an electrodialysis mode for removing one or more target pollutants from a feedwater stream, and (2) a second, reversed polarity provides an electrolysis mode for converting concentrated pollutant(s) to environmentally benign, less harmful, and/or value-added products. The electrodialysis and electrolysis modes are provided by the same system, thereby minimizing or negating the need for a separate, independent electrolysis system of other conversion system downstream of the electrodialysis system.

By reducing the need for separate, independent systems, the embodiments described herein beneficially provide increased operational and space efficiencies. Moreover, the electrodialysis mode functions to concentrate target pollutants at the active sites where effective conversion can occur during the subsequent electrolysis mode, thereby further increasing overall operational efficiencies.

In one embodiment, a system configured to provide both electrodialysis and electrolysis of a feedwater comprises a first electrode including a catalyst material associated therewith, a second electrode disposed opposite the first electrode, and one or more ion exchange membranes disposed between the first and second electrodes. The one or more ion exchange membranes are arranged to define: (i) a feedwater compartment through which a feedwater flows during operation of the system, and (ii) a first ion concentration compartment, the first ion concentration compartment being adjacent to the first electrode such that during operation of the system an ion-concentrated stream contacts the first electrode.

The one or more ion exchange membranes may comprise at least one anion exchange membrane and at least one cation exchange membrane. In such embodiments, the feedwater compartment is disposed between the anion exchange membrane and the cation exchange membrane, an anion concentration compartment is disposed between the anion exchange membrane and whichever electrode has a positive charge during electrodialysis mode, and a cation concentration compartment is disposed between the cation exchange membrane and whichever electrode has a negative charge during electrodialysis mode.

In the example of nitrate treatment, the ion exchange membranes are arranged so that the anion concentration compartment is adjacent the first electrode, and the first electrode is operated with a positive charge during electrodialysis mode to attract and concentrate nitrate ions into the anion concentration compartment. During electrolysis mode, the polarity of the electrodes is reversed so that the first electrode now carries a negative charge. The negative charge enables the catalyst material of the first electrode to catalyze the conversion of concentrated nitrate into environmentally benign, less harmful, and/or value-added products (such as nitrogen gas).

In some embodiments, the second electrode can also include an integrated catalyst material. In such embodiments, both cation and anion contaminants can be removed from the feedwater and then converted in the subsequent electrolysis mode.

A method for removing one or more contaminants from a feedwater via electrodialysis and converting the one or more contaminants via electrolysis comprises the steps of: providing an electrodialysis and electrolysis system such as described above; operating the system in an electrodialysis mode by providing a first polarity across the first and second electrodes while passing the feedwater through the feedwater channel to thereby generate an ion-concentrated stream in the first ion concentration compartment; and operating the system in an electrolysis mode by reversing the polarity across the first and second electrodes, wherein the catalyst material, under the reversed polarity, catalyzes conversion of one or more ions concentrated in the first ion concentration compartment.

In some embodiments, the feedwater comprises nitrate, and the nitrate is removed from the feedwater and concentrated in the first ion concentration compartment during the electrodialysis mode. Subsequently, at least a portion of the concentrated nitrate is reduced to nitrogen gas upon reversing polarity during the electrolysis mode. In this example, the first electrode is operated with a positive charge during the electrodialysis mode and with a negative charge during the electrolysis mode.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

Various objects, features, characteristics, and advantages of the invention will become apparent and more readily appreciated from the following description of the embodiments, taken in conjunction with the accompanying drawings and the appended claims, all of which form a part of this specification. In the Drawings, like reference numerals may be utilized to designate corresponding or similar parts in the various Figures, and the various elements depicted are not necessarily drawn to scale, wherein:

FIGS. 3A and 3B illustrate scanning electron microscope (SEM) images of Pd—Cu nanoparticles deposited on a carbon foam substrate using a co-electrodeposition method, with particle sizes ranging from about 100 nm to about 300 nm;

DETAILED DESCRIPTION

Overview of Electrodialysis/Electrolysis Systems

Embodiments described herein include systems and processes for the removal of pollutants from water and their conversion to less harmful products. Certain embodiments are directed to systems configured to provide bi-functional operation in which (1) a first polarity provides an electrodialysis mode for removing one or more target pollutants from a feedwater stream, and (2) a second, reversed polarity provides an electrolysis mode for converting concentrated pollutant(s) to environmentally benign, less harmful, and/or value-added products. The electrodialysis and electrolysis modes are provided by the same system, thereby minimizing or negating the need for a separate, independent electrolysis system of other conversion system downstream of the electrodialysis system.

Figure 1A:
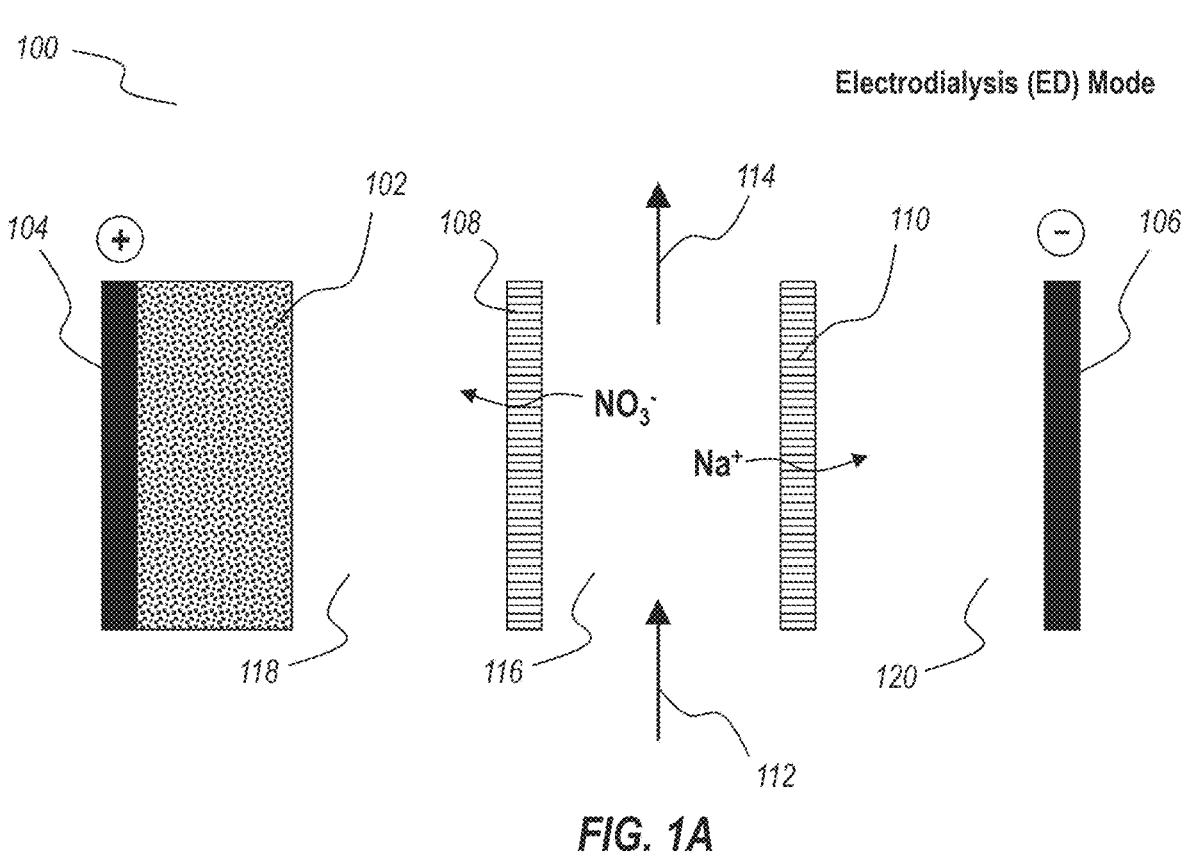
FIG. 1A illustrates a system configured for removing one or more pollutants (nitrate, in this example) from a feedwater stream and converting the one or more pollutants to environmentally benign, less harmful, and/or value-added products, showing the system in an electrodialysis mode, with a first polarity setting, that functions to remove the pollutant(s) from the feedwater stream and concentrate the pollutant(s) at corresponding electrodes.
Figure 1B:
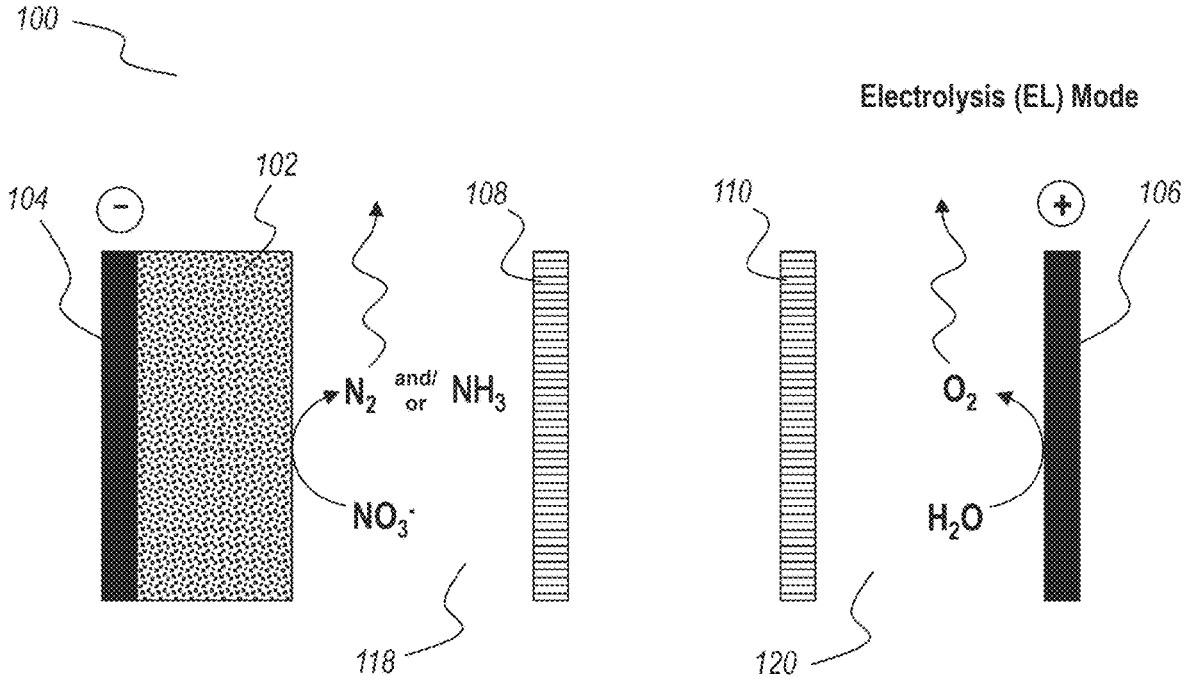
FIG. 1B illustrates the system of FIG. 1A in an electrolysis mode, with a reversed polarity setting, that functions to convert the concentrated pollutant(s) to environmentally benign, less harmful, and/or value-added products (converting nitrate to nitrogen gas, in this example)

FIGS. 1A and 1B illustrate an exemplary hybrid electrodialysis and electrolysis system 100. The illustrated system 100 includes a first electrode 104 and an opposing second electrode 106. At least one anion exchange membrane 108 and at least one cation exchange membrane 110 are disposed between the electrodes 104 and 106. Although only a single anion exchange membrane 108 and a single cation exchange membrane 110 are illustrated here, it will be understood that alternative embodiments may include multiples of either or both type of ion exchange membrane. Ion exchange membranes and other electrodialysis components as known in the art may be utilized, such as membranes components sold under the trade name NEOSEPTA (Astom Corp.) and components sold by PCCell Gmbh.

The ion exchange membranes 108 and 110 are spaced such that a feedwater compartment 116 in formed therebetween. The feedwater compartment 116 is configured to receive an inlet stream 112 (with high relative concentration of pollutant(s)) and to output an outlet stream 114 (with lowered concentration of pollutant(s)). The anion exchange membrane 108 and the first electrode 104 define an anion concentration compartment 118 formed therebetween. The cation exchange membrane 110 and the second electrode 106 define a cation concentration compartment 120 formed therebetween.

In electrodialysis mode operation (FIG. 1A), one or more ions pass from the feedwater compartment 116 toward their respective electrodes of opposite charge. In the illustrated example, the first electrode 104 is provided with a positive charge and the second electrode 106 is provided with a negative charge. Referring to nitrate (a negatively charged ion) as an example pollutant targeted for removal, the nitrate passes from the feedwater compartment 116, through the anion exchange membrane 108, and into the anion concentration compartment 118, which is disposed adjacent to the first electrode 104. One or more types of cations (e.g., sodium ions) can pass from the feedwater compartment 116, through the cation exchange membrane 110, and into the cation concentration compartment 120, which is disposed adjacent the second electrode 106.

After the system 100 has operated in the electrodialysis mode for a first time period, the polarities of the electrodes 104 and 106 are reversed and the system 100 transitions to the electrolysis mode. FIG. 1B illustrates the system 100 under operation in electrolysis mode. As shown, the polarities of electrodes 104 and 106 are reversed such that the first electrode is now negatively charged and the second electrode 106 is now positively charged.

As shown, the first electrode 104 includes a catalyst portion 102 connected and/or integrated thereto. The catalyst portion 102 incorporates one or more catalysts configured to provide conversion of the pollutant(s) that concentrate in the anion concentration compartment 118 to environmentally benign, less harmful, and/or value-added products. Continuing with the example of nitrate, nitrate concentrated in the anion concentration compartment 118 is reduced to less harmful nitrogen products such as nitrite, ammonia/ammonium, and/or (preferably) nitrogen gas. Corresponding oxidation reactions may occur at the second electrode 106 (e.g., water splitting).

A hybrid electrodialysis and electrolysis system such as illustrated beneficially combines the functions of pollutant removal and pollutant conversion into a single unit/system. This improves operational and space efficiencies as compared to using a dedicated electrodialysis system and a separate, downstream electrolysis system for denitrification. Moreover, because electrolytic energy efficiency and electrolytic rates are proportional to the localized concentration of the target pollutant, the pre-concentration of the pollutant in the direct vicinity of the catalyst portion 102 beneficially enables effective and efficient conversion within the same unit/system.

Figure 1C:
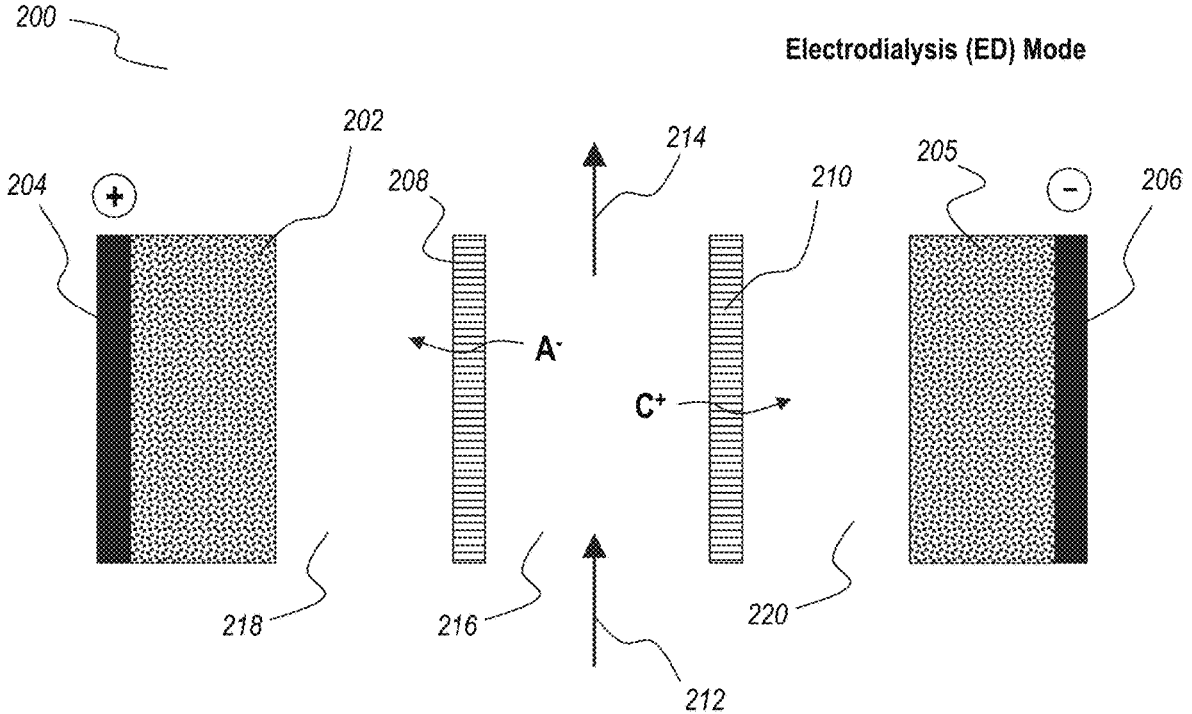
FIG. 1C illustrates an alternative embodiment in which both electrodes are associated with a catalyst portion, the system therefore being capable of removing different pollutants of opposite charge and using the electrodes to convert the different pollutants.

FIG. 1C illustrates another embodiment of a hybrid electrodialysis and electrolysis system 200. The system 200 is similar in many respects to the hybrid electrodialysis and electrolysis system 100, and similarly includes first and second electrodes 204 and 206, an anion exchange membrane 208, and a cation exchange membrane 210. As with the system 100, these components are arranged to form a feedwater compartment 216 through which an inlet stream 212 and outlet stream 214 pass, an anion concentration compartment 218, and a cation concentration compartment 220. In this embodiment, both the first electrode 204 and the second electrode 206 are associated with respective catalyst portions 202 and 205. The system 200 is therefore capable of removing different pollutants of opposite charge (in electrodialysis mode) and then using both electrodes to convert the different pollutants to environmentally benign, less harmful, and/or value-added products (in electrolysis mode).

Additional Electrode & Catalyst Details

The following features can be incorporated individually or in combination with one or more of the other features into the hybrid electrodialysis and electrolysis systems described herein (including system 100 and/or system 200).

Various substrates may be utilized to form one or both electrodes of the hybrid electrodialysis and electrolysis system. Suitable electrode sub state materials include graphite, nickel, copper, iron, polytetrafluoroethylene (PTFE) membrane materials, carbon (e.g., activated carbon, carbon nanotubes), transparent conductive oxides, and combinations thereof. The form of the substrate is preferably configured to provide a high surface area. For example, the substrate may be configured as a mesh, felt, foamed structure, or other porous material. In systems where only one electrode includes a catalytic portion, the counter electrode may be formed from a simple conductive material such as stainless steel.

Where a porous substrate is utilized, the pores preferably have an average diameter of about 100 $\mu$m to about 1 mm, or more preferably about 200 $\mu$m to about 800 $\mu$m, or about 300 $\mu$m to about 700 $\mu$m, or about 350 $\mu$m to about 650 $\mu$m, or about 400 $\mu$m to about 600 $\mu$m, such as about 500 $\mu$m, or within a range having any two of the foregoing values as endpoints. A porous electrode substrate with an average pore diameter within the foregoing values was found to optimally balance sufficient charge transfer capabilities with high surface areas and ability to effectively integrate catalyst material therein.

Further, when a porous substrate is utilized, the substrate is preferably configured with a pore density of about 20 to about 200 pores per square inch (ppi), or more preferably about 25 ppi to about 150 ppi, or about 30 ppi to about 120 ppi, or about 35 ppi to about 100 ppi, or about 40 ppi to about 80 ppi, or about 50 ppi to about 70 ppi, such as about 60 ppi, or a pore density within a range defined by any two of the foregoing values. A substrate with a pore density within the foregoing values was found to provide sufficiently low charge transfer resistance while also providing sufficiently high electrochemically active surface area.

The catalyst associated with one or more of the electrodes to form the catalyst portion(s) may be provided as nanoparticles that are embedded or otherwise incorporated into the corresponding electrodes. For example, where the electrode substrate is formed as a porous material, catalyst nanoparticles may be distributed and embedded within the porous surfaces of the substrate to take advantage of the increased surface area provided by the porous structure.

Suitable catalyst materials for nitrate reduction (but which may be additionally or alternatively used for other pollutants) include Cu, Pd—Cu, Ni, Zn—Cu, Pt, Rh, Pt—Rh, Pd—Cu, Pt—Cu, Rh—Cu, Ir—Cu, Sn—Pt, Sn—Pd—Au, Pd—Sn, Pd—Cu, Pd—In, Fe—Ni, Pd, Ag, Au, Ru, Ir, metal oxides, metal hydroxides, and combinations thereof.

Exemplary electrode substrates and catalysts, and certain exemplary combinations of electrode substrates and catalysts that may be utilized together in a hybrid electrodialysis and electrolysis system, are provided below in Table 1:

TABLE 1

| Substrate material | Catalyst |
| --- | --- |
| Graphite | Cu and Pd—Cu |
| Ni | Ni particles |
| | Zn—Cu Alloy |
| Cu | Cu |
| PTFE Membrane | Pt |
| PTFE Membrane | Rh |
| PTFE Membrane | Pt—Rh alloy |
| Activated Carbon | Pd—Cu, Pt—Cu, Rh—Cu, and Ir—Cu |
| | Sn—Pt, and Sn—Pd—Au |
| Graphite | Pt |
| Ni | Cu |
| Cu | Cu |
| Ni Foam | Cu |
| ITO | Pd—Sn |
| Carbon Nanotube (CNT) | Pd—Cu |
| CNT-TiO2 | Pd—Cu |
| Lignocellulose | Pd—In |
| Activated Carbon felt | Pd—Cu |
| Fe | Fe |
| Fe | Pd |
| Fe | Ag |

Catalyst nanoparticles may be loaded onto the electrode substrate using a variety of integration or deposition methods known in the art. In some embodiments, electrodeposition is utilized to deposit the catalyst nanoparticles. In some embodiments where a multi-metallic catalyst is utilized, each metal may be electrodeposited using a co-electrodeposition technique. Alternatively, a galvanic displacement technique may be utilized wherein a base metal (having a relatively higher oxidation potential) is first deposited on the substrate, and subsequently a second metal (having a relatively lower oxidation potential) is introduced to galvanically displace the first metal. The mass loading of catalyst nanoparticles to the electrode substrate may range from about 0.05 $mg_{catalyst}/cm^2$ to about 0.25 or up to about 0.5 $mg_{catalyst}/cm^2$.

The size of the catalyst nanoparticles integrated with the electrode substrate may vary according to particular application needs. Catalyst nanoparticles may range in average size from about 2 nm to about 500 nm, more typically about 10 nm to about 300 nm, or about 15 nm to about 200 nm, or about 20 nm to about 100 nm, or may have an average size within a range with endpoints defined by any two of the foregoing values. Systems utilizing catalyst nanoparticles within the foregoing size ranges were found to provide effective surface area and catalytic activity while also balancing the ability to effectively integrate the nanoparticles into the pores of the electrode substrate.

Exemplary Water Treatment Applications

The hybrid electrodialysis and electrolysis systems described herein may be utilized in a variety of water treatment applications. For nitrate removal and conversion applications, such systems can be installed as an edge-of-field installation for fields that are drained using tiles. The systems can then treat nitrate-laden waters prior to discharge from the field into surface waters. Systems can also be utilized to treat community water systems or to treat private water supplies (e.g., private groundwater wells). Presently, in the U.S., there are over 1,700 community drinking water systems with nitrate levels higher than 10 mg/L. Many private wells have nitrate levels above recommended health advisory levels, particularly in agricultural areas.

Although many of the examples described herein relate to nitrate removal and conversion, the components and principles described herein may also be utilized for the removal and conversion of a wide variety of other chemical and/or biological contaminants/pollutants. A non-exhaustive list of such chemical contaminants includes nitrogen, bleach, salts, pesticides, metals, toxins produced by bacteria, nitrate (NO3), chloride (Cl), chromium-6 (Cr-6), chromium-3 (Cr-6), copper (Cu), fluoride (F), iron (Fe), selenium (VI), boron, lithium (Li), sodium (Na), calcium (Ca), magnesium (Mg), zinc (Zn), arsenic (As), uranium (U), strontium (Sr), cadmium (Cd), cyanide (CN), nitrite (NO2), phosphate, perfluorooctanoic acid (PFOA) and perfluorooctane sulfonate (PFOS), 1,1-dichloroethane, acetochlor, methyl bromide (bromomethane), metolachlor, nitrobenzene, 1,4-Dioxane, 1,2,3-trichloropropane, and chloroamine.

A non-exhaustive list of medicinal pollutants that may be removed from feedwater and converted using the systems described herein includes aspirin, codeine, cyclophosphamide, galaxolide, pentoxifylline, tonalide, triclosan, etofibrate, etofyllinclofibrat, flurbiprofen, ketoprofen, nadolol, tolfenamic acid, carbamazepine, diazepam, ibuprofen, paracetamol, phenazone, bezafibrate, clofibrate, diclofenac, fenoprofen, fenofibrate, femfibrozil, indomethacine, iopromide, mefenamic acid, metoprolol, naproxen, propranolol, propyphenazone, roxithromycin, salbutamol, sulfamethoxazole, doxycycline, estrone, hydrochlorothiazide, iopamidol, metronidazole, ofloxacin, enalapril, furazolidone, ifosfamide, ketorolac, methicillin, nafcillin, erythromycin, furosemide, iomeprol, lincomycin, methotrexate, norfloxacin, oleandomycin, simvastatin, sotalol, omeprazole, oxacillin, oxytetracycline, penicillin, pindolol, piroxicam, ranitidine, ronidazole, spiramycin, sulfacetamide, sulfadiazine, sulfadiamethoxine, sulfadimidine, sulfafuanidine, sulfamethazine, sulfamethazine, sulfapyridine, sulfasalazine, sulfathiazine, tamoxifen, terbutaline, tetracycline, tilmicosin, trimethoprim, tylosin, virginiamycin, 17α-ethinylestradiol, 17β-estradiol, acetyl-sulfamethoxazole, amidotrizoic acid, aminopyridine, amoxycillin, anhydro-erythromycin, atenolol, bisoprolol, chloramphenicol, chlortetracycline, ciprofloxacin, clarithromycin, clenbuterol, cloxacillin, cyclophosphamide, dapsone, dimethyl diazepam, dextropropoxyphene, dicloxacillin, acetaminophen, and carbamazepine.

A non-exhaustive list of biological contaminants/pollutants that may be removed from feedwater and optionally destroyed using the systems described herein includes pathogenic microorganisms (viruses, bacteria, fungi, protozoa) and DNA and RNA contaminants. Common feedwater pathogens of concern include adenoviruses, caliciviruses, *Campylobacter jejuni*, enteroviruses, *Escherichia coli*, *Helicobacter pylori*, hepatitis A virus, *Legionella pneumophila*, *Mycobacterium avium*, *Naegleria fowleri*, and *Salmonella enterica*.

Table 2 provides a particular list of example contaminants that can be removed using the systems described herein, along with the present maximum contaminant level (MCL) as established by the U.S. Environmental Protection Agency (EPA), potential negative health effects associated with the contaminant, and common sources of the contaminant:

TABLE 2

| Contaminants | MCL (mg/L) | Potential health effects | Common source |
|---|---|---|---|
| Nitrate (NO3—) | 10 | Infants could become seriously ill and, if untreated, may die. (blue-baby syndrome) | Runoff from fertilizer use; leaching from septic tanks, sewage; erosion of natural deposits |
| Chloride (Cl) | 4 | Eye/nose irritation; stomach discomfort | Water additive used to control microbes |
| Chromium-6 (Cr-6) | 0.1 | Allergic dermatitis | Discharge from steel and pulp mills; erosion of natural deposits |
| Chromium-3 (Cr-6 | 0.1 | Allergic dermatitis | Discharge from steel and pulp mills; erosion of natural deposits |
| Copper (Cu) | 1.3 | Short-term exposure: Gastrointestinal distress. Long-term exposure: Liver or kidney damage | Corrosion of household plumbing systems; erosion of natural deposits |
| Fluoride (F) | 4 | Bone disease (pain and tenderness of the bones); children may get mottled teeth | Water additive which promotes strong teeth; erosion of natural deposits; discharge from fertilizer and aluminum factories |
| Iron (Fe) | 0.3 | | |
| Selenium (VI) | 0.05 | Hair or fingernail loss; numbness in fingers or toes; circulatory problems | Discharge from petroleum and metal refineries; erosion of natural deposits; discharge from mines |
| Boron | 0.5 | | |
| Lithium | | | |
| Sodium (Na) | 200 (WHO limit) | | |
| Calcium | | | |
| Magnesium | | | |
| Zinc | 5 | | |
| Arsenic (As) | 0.01 | Skin damage or problems with circulatory systems, increased risk of cancer | Erosion of natural deposits; runoff from orchards; runoff from glass & electronics production wastes |
| Uranium | 30 μg/L | Increased risk of cancer, kidney toxicity | Erosion of natural deposits |
| Strontium | | | |
| Cadmium | 0.005 | Kidney damage | Corrosion of galvanized pipes; erosion of natural deposits; discharge from metal refineries; runoff from waste batteries and paints |
| Cyanide | 0.2 | Nerve damage or thyroid problems | Discharge from steel/metal factories; discharge from plastic and fertilizer factories |
| Nitrite (NO$_2^-$) | 1 | Similar to risks of nitrate | Runoff from fertilizer use; leaching from septic tanks, sewage; erosion of natural deposits |
| Phosphate | | | Runoff from fertilizer use; erosion of natural deposits |

EXAMPLES

Example 1: Electrode Substrate Testing

Various carbon supports (carbon foam, carbon cloth, carbon felt; available from vendor Fuel Cell Store), and their electroactivity (charge transfer resistance) was characterized using AC EIS. The EIS for these carbon supports was recorded in 0.1M $H_2SO_4$ at the open-circuit voltage in the frequency range of 1 MHz to 1 Hz with a 10-mV peak-to-peak sinusoidal potential perturbation. Saturated silver/silver chloride was used as the reference electrode and Pt wire as the counter electrode.

Figure 2A:
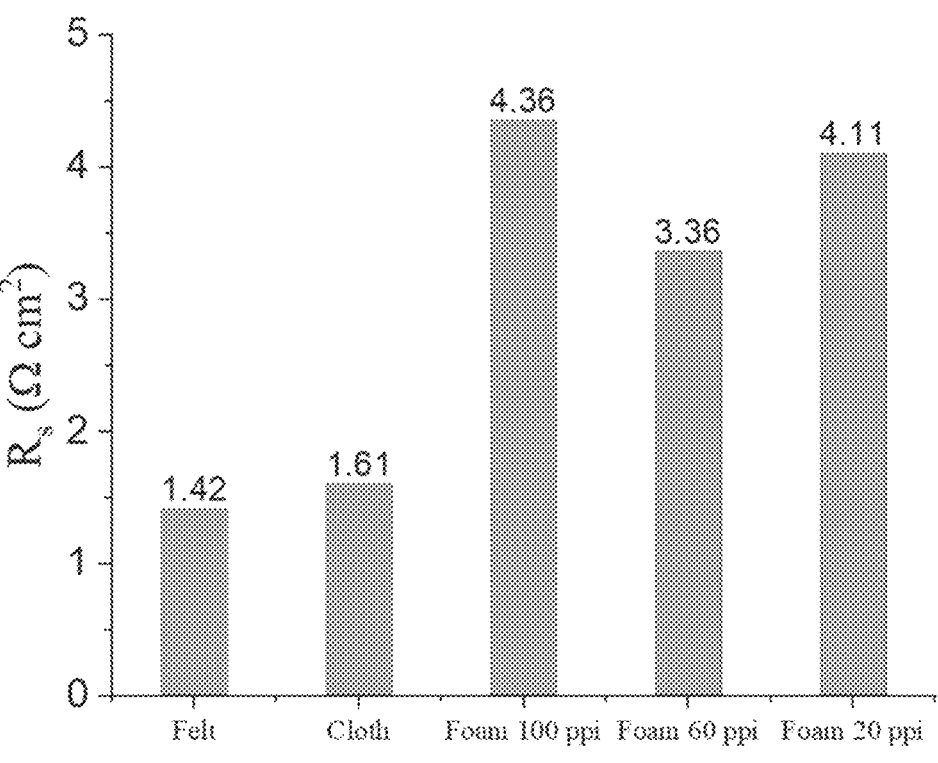
FIGS. 2A-2C illustrate results from electrochemical impedance spectroscopy (EIS) testing, showing series resistance results for different carbon materials (FIG. 2A), charge transfer resistances for the tested carbon materials (FIG. 2B), and electrochemically active surface area of the tested carbon materials (FIG. 2C)
Figure 2B:
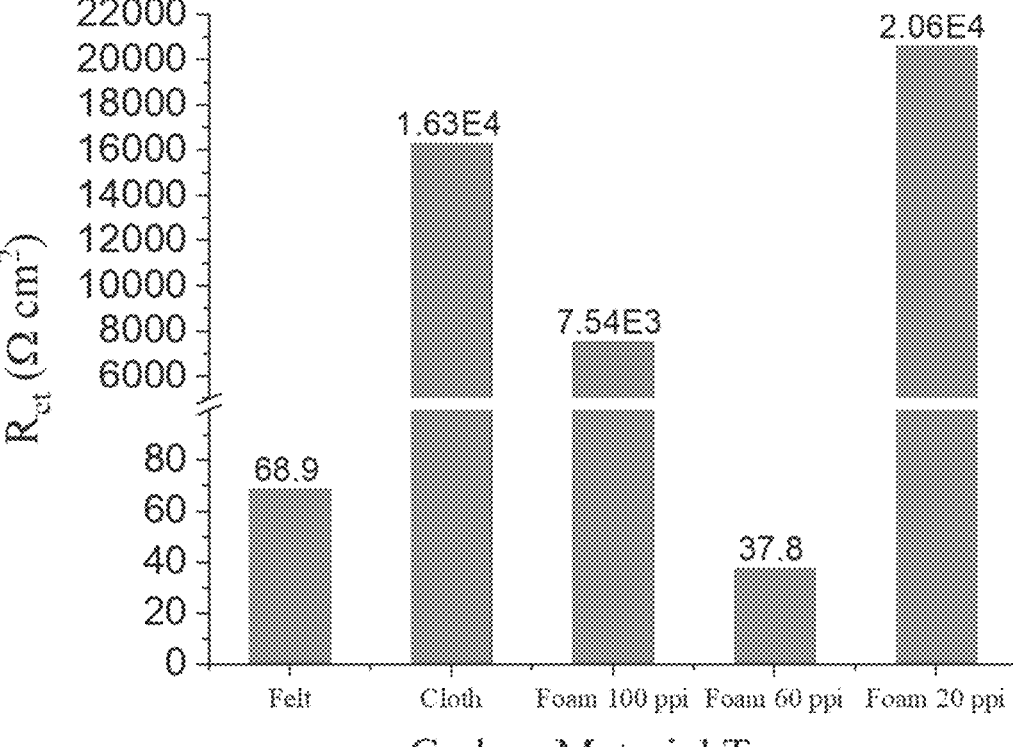
Figure 2C:
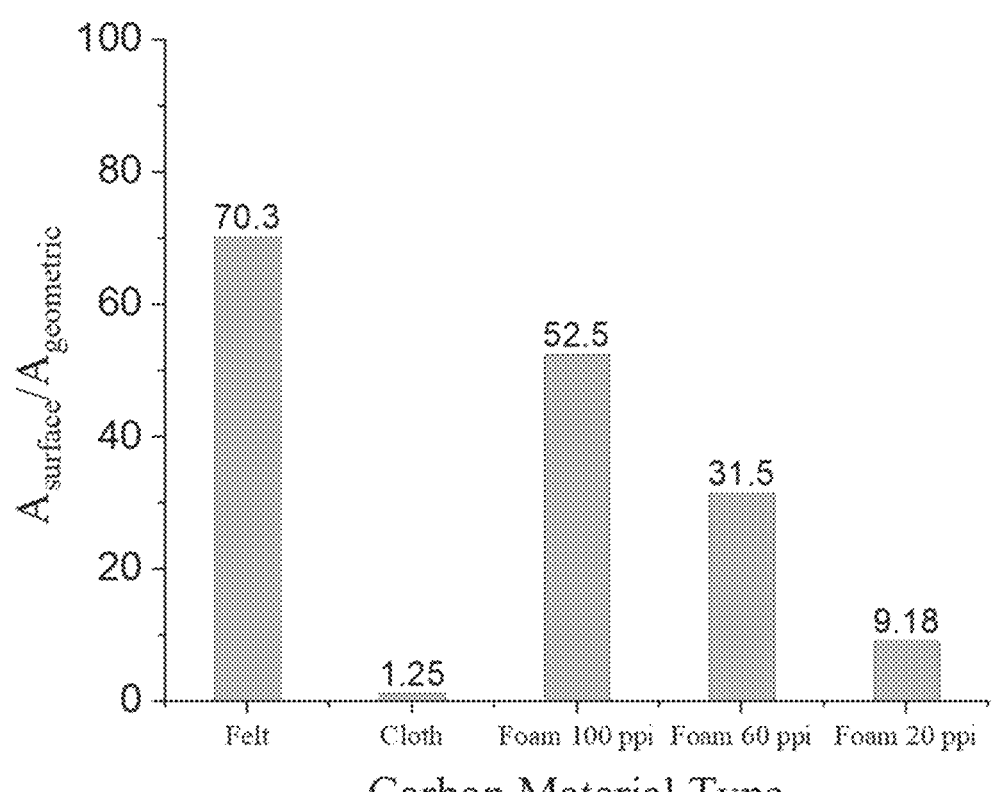

All carbon materials showed similar uncompensated series resistances (from 1.4 to 4.4-ohm cm$^2$) as measured from the EIS, indicating the robustness of the measurement set-up (FIG. 2A). We then determined the charge transfer resistances from EIS for the carbon materials tested (FIG. 2B). Lower charge transfer resistance corresponds to a faster electron transfer rate (faster reaction rate), a key attribute for electrocatalysis. Our target was to achieve charge transfer resistances <100-ohm cm$^2$, suitable for effective electrolysis applications. Carbon felt and carbon foam with 60 ppi met this criterion. Another important characteristic of electroactive support is its electrochemically active surface area. For typical electrolysis applications, this value is preferred to be >10 when normalized with its geometric area. Carbon felt and carbon foam with 60 and 100 ppi met this criterion (FIG. 2C).

Example 2: Comparison of Porous Carbon Electrode to Planar Platinum Electrode

Figure 2D:
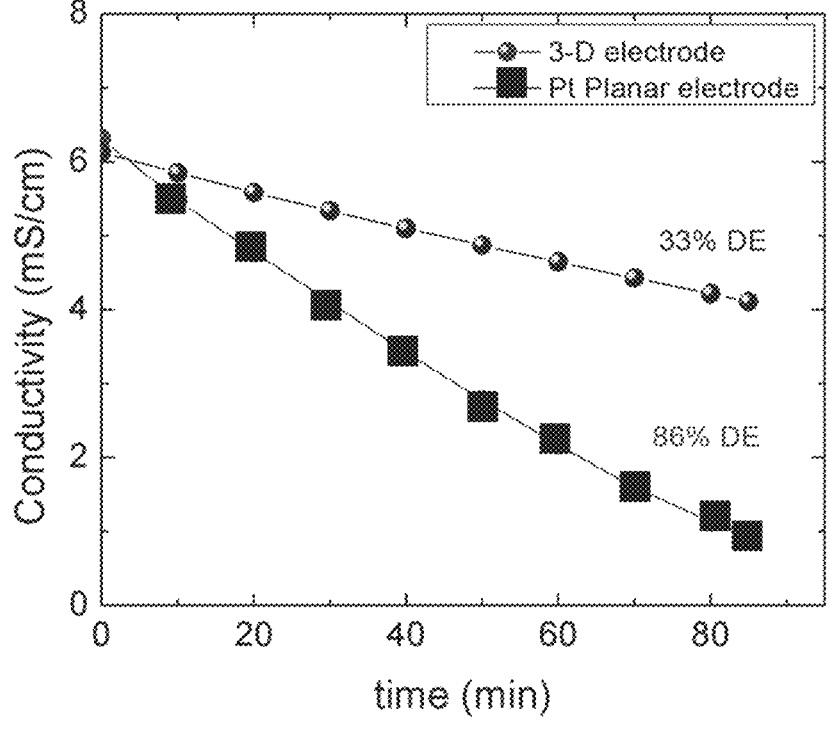
FIG. 2D compares the desalination performance over time of a "3D" carbon foam electrode to a conventional platinum (Pt) planar electrode, showing that the 3D electrode achieved 86% desalination efficiency (DE) [(initial concentration−final concentration)/initial concentration] in 85 min, reached a target drinking water level, and had a 93% water recovery rate as compared to the planar electrode which achieved 33% demineralization efficiency without reaching the target drinking water level.

A porous carbon electrode was also compared to a planar Pt electrode. FIG. 2D compares the desalination performance over time of a "3D" carbon foam electrode to a conventional planar Pt electrode, showing that the 3D electrode achieved 86% desalination efficiency (DE) [(initial concentration−final concentration)/initial concentration] in 85 min, reached a target drinking water level, and had a 93% water recovery rate as compared to the planar electrode which achieved 33% demineralization efficiency without reaching the target drinking water level. The comparison was conducted using a flow rate of 400 ml/min and a voltage of 2.6 V.

Example 3: Integration of Catalyst Material with Electrode Substrate

We developed various synthetic routes to deposit catalysts (Pd, Cu, and Pd—Cu bimetallic systems) on carbon substrates. Pd and Cu were selected as most likely to have high selectivity for nitrate reduction. Electrodeposition allows the synthesis of catalysts directly on the most accessible electroactive sites of the support substrate, thereby increasing catalyst utilization efficiency.

For bimetallic systems, two synthetic techniques were employed. The first technique utilized the co-electrodeposition of both metals in one single step. In the second technique, a base metal was first electrodeposited (Cu), which was then galvanically displaced by the second metal (Pd) having a lower oxidation potential than the displaced metal (Cu). While co-electrodeposition benefits from simplicity, electrodeposition followed by galvanic displacement enables good spatial for the deposition of the second metal. All synthesized catalysts were characterized for their morphology and elemental composition using SEM and energy dispersive spectroscopy (EDS).

Figure 4A:
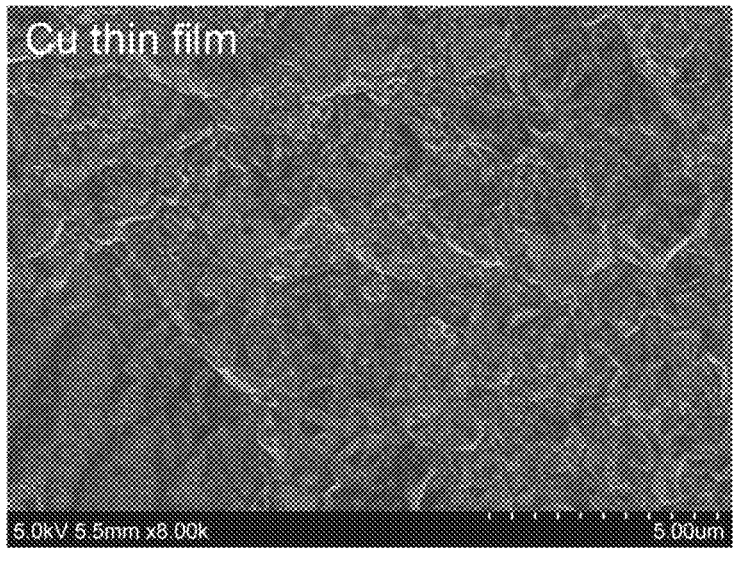
FIGS. 4A and 4B illustrate SEM images of palladium (Pd) nanoparticles deposited on copper (Cu) using a galvanic displacement method.
Figure 4B:
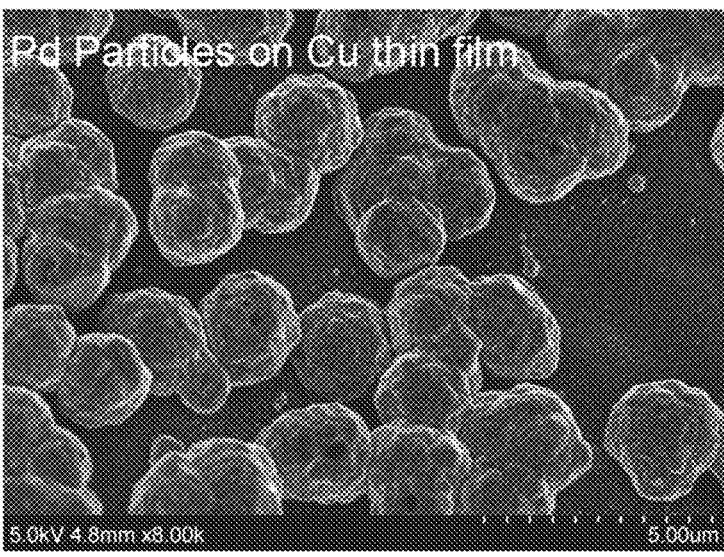

FIGS. 3A and 3B illustrate SEM images of Pd—Cu nanoparticles deposited on a carbon foam substrate using the co-electrodeposition method, with particle sizes ranging from about 100 nm to about 300 nm. FIGS. 4A and 4B illustrate SEM images of Pd nanoparticles deposited on copper Cu using the galvanic displacement method.

Example 4: Nitrate Reduction Using Different Catalyst Systems

Nitrate reduction studies were conducted in 30 mM $NaNO_3$ in 0.1M NaOH electrolyte using a half-cell two-compartment electrochemical set-up. For control, electrochemical reduction studies were also carried out in 0.1M NaOH electrolyte and 0.1M NaOH with 30 mM $NaNO_2$ electrolyte.

Figure 5A:
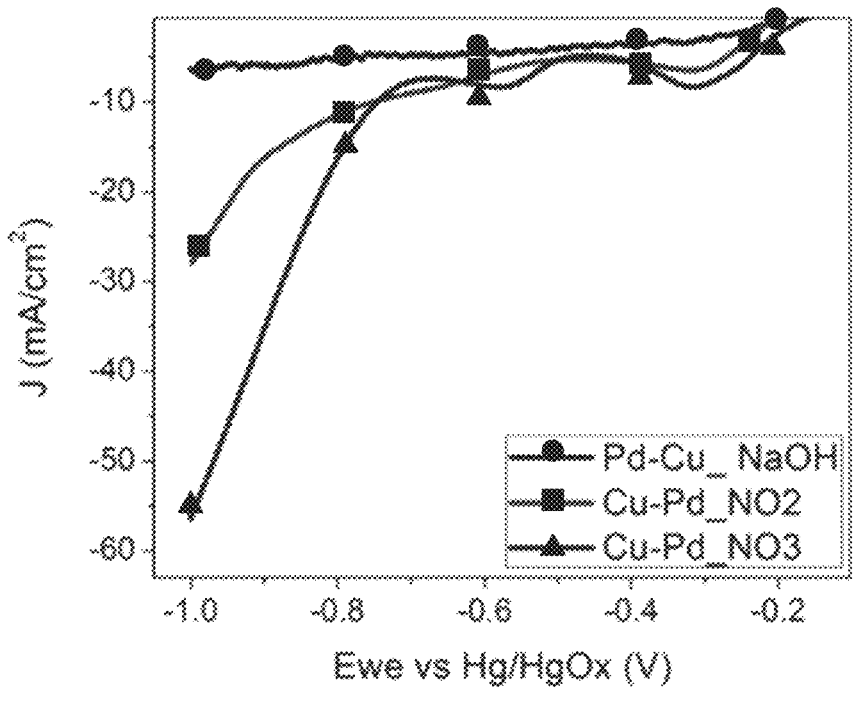
FIG. 5A compares polarization curves of Pd—Cu electrocatalysts in different electrolytes (NaOH, $NO_2$, and $NO_3$)

The catalytic activity of the Pd—Cu electrocatalyst for nitrate reduction was evaluated by linear sweep voltammetry measurements at 5 mV/s in $N_2$-saturated 0.1M NaOH electrolyte with 30 mM $NaNO_3$ electrolyte, and the data are compared in the absence of nitrate ion concentration. Nitrogen was purged to minimize currents originating from the reduction of dissolved oxygen. As seen in FIG. 5A, a clear increase in reduction reaction currents was observed in the presence of nitrate ion concentration as the potential was scanned from −0.2V to −1.0 V vs. mercury/mercury oxide reference electrode. Potentials more negative than −1.0 V were not chosen to minimize hydrogen evolution due to water reduction reaction. The Pd—Cu system also showed an increase in reduction currents in the presence of nitrite ions. Interestingly, higher activity was obtained for nitrate reduction compared to nitrite reduction for potentials more negative than −0.8 V.

Figure 5B:
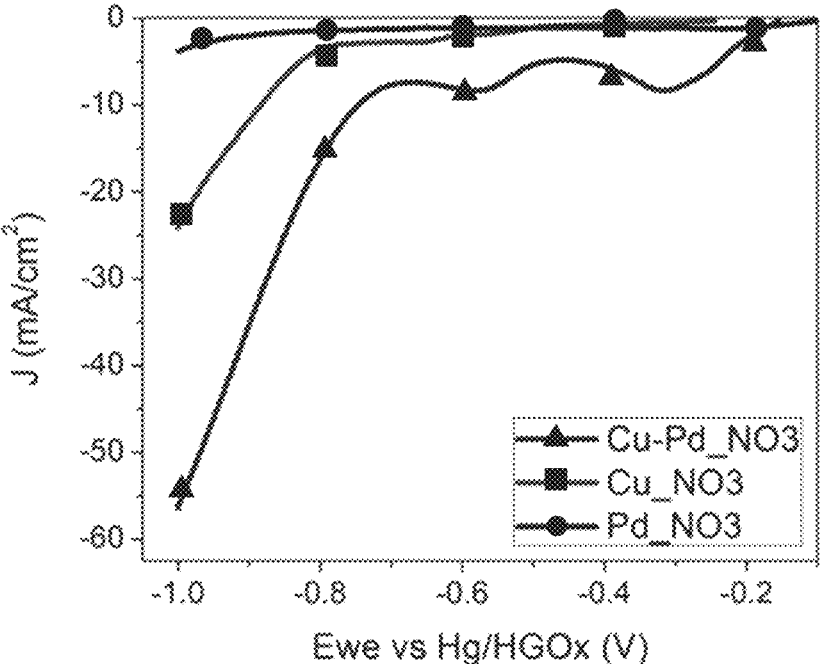
FIG. 5B compares polarization curves showing $NO_3$ reduction for different catalyst systems (Cu—Pd, Cu, and Pd)

FIG. 5B shows the effect of the catalytic system on nitrate reduction. Three different catalytic systems were compared: Pd; Cu; and Pd—Cu. Although both Pd and Cu showed some nitrate reduction currents, the Pd—Cu system provided the greatest effects, showing that a bifunctional/bimetallic catalyst can provide efficient electrochemical reduction of nitrates.

Example 5: Nitrate Reduction Conversion Efficiency

Figure 6A:
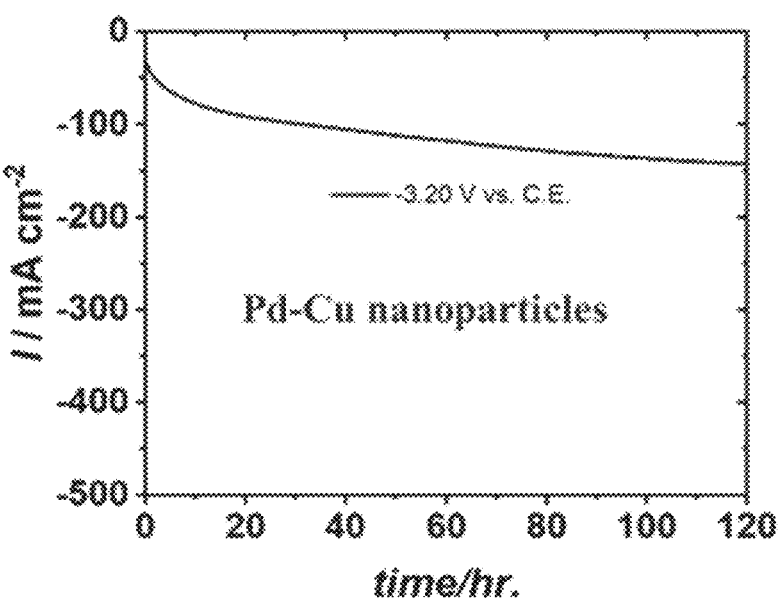
FIG. 6A illustrates results of a nitrate conversion test, showing operation of Pd—Cu nanoparticles at 3.2 V for over 100 hours.
Figure 6B:
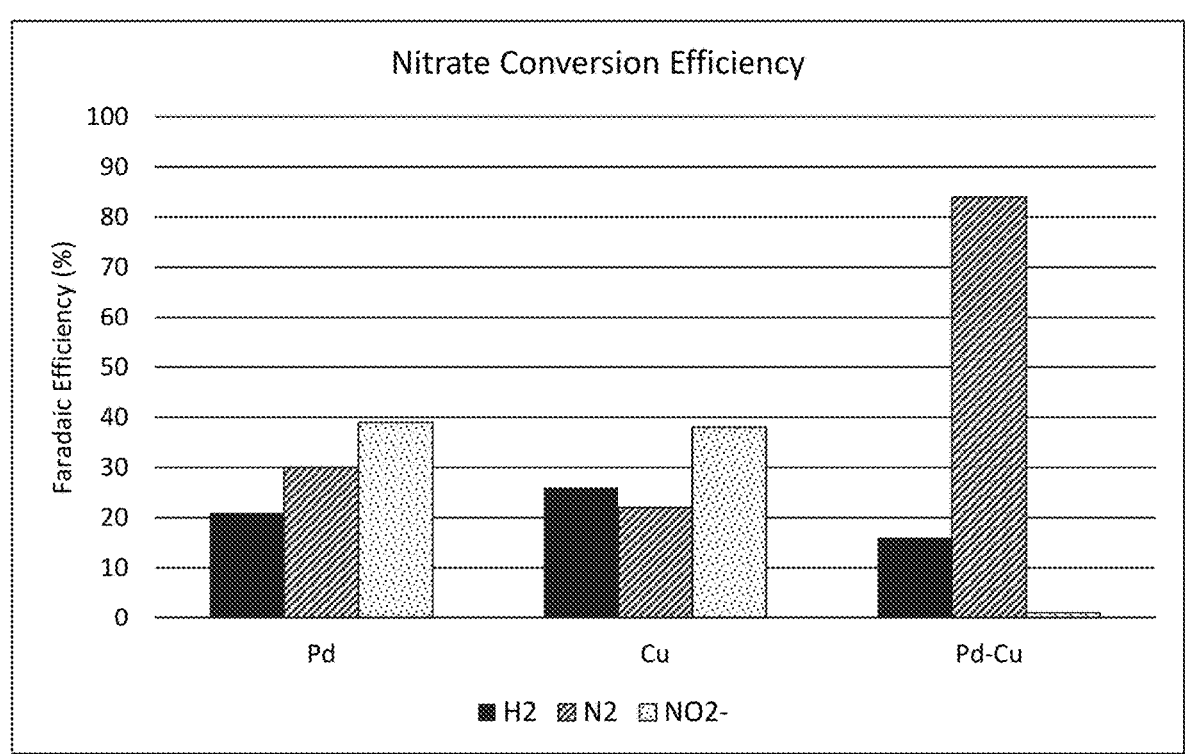
FIG. 6B illustrates the proportions of products obtained in the nitrate conversion test for different catalysts utilized, showing that a Pd—Cu system had effective nitrate-to-nitrogen selectivity.

The Pd—Cu catalyst was then integrated into a half-cell configuration and tested for its stability for nitrate conversion under accelerated testing conditions (1 $kA/m^2$=100 $mA/cm^2$). Testing was conducted in 0.1 M $NaNO_3$ neutral electrolyte using an in-house half-cell two-compartment electrochemical set-up. FIG. 6A shows operation of the Pd—Cu nanoparticles at 3.2 V for over 100 hours. This voltage was chosen so the obtained currents are greater than 100 $mA/cm^2$. After 100 hours of operation, we tested the products obtained from different catalyst materials synthesized (FIG. 6B). Pd and Cu showed about 40% selectivity for $N_2$ production and produced nitrite and hydrogen as the co-products. In contrast, Pd—Cu nanoparticles showed very effective nitrate-to-nitrogen selectivity, reaching a nitrogen conversion efficiency of 84% after 100 hours of operation.

Example 6: Nitrate Removal from Different Feedwaters

We assessed the performance of the electrode assembly described in the previous Examples in different feed water sources listed in Table 3. For each feedwater chemistry, nitrate removal in electrodialysis mode, nitrate-to-nitrogen conversion in electrolysis mode, and freshwater recovery were experimentally determined. The initial nitrate concentration was 1000 mg/L and the temperature was maintained at 26° C.

TABLE 3

| Feed | Sodium | Bicarbonate | Sulfate | Nitrate removal from ED | Nitrate Conversion | Fresh water recovery |
|---|---|---|---|---|---|---|
| 1 | 500 | 500 | 100 | 97 | 84 | 94 |
| 2 | 2000 | 2000 | 500 | 98 | 82 | 97 |
| 3 | 5000 | 5000 | 1000 | 97 | 79 | 93 |

TABLE 3-continued

| | Caclium | Sulfate | Na + Mg | Nitrate removal from ED | Nitrate Conversion | Fresh water recovery |
|---|---|---|---|---|---|---|
| 4 | 500 | 500 | 100 | 95 | 82 | 92 |
| 5 | 2000 | 2000 | 500 | 98 | 88 | 91 |
| 6 | 5000 | 5000 | 1000 | 95 | 79 | 90 |

| | Sodium | Chloride | | Nitrate removal from ED | Nitrate Conversion | Fresh water recovery |
|---|---|---|---|---|---|---|
| 7 | 500 | 500 | | 97 | 86 | 96 |
| 8 | 2000 | 2000 | | 98 | 83 | 97 |
| 9 | 5000 | 5000 | | 89 | 74 | 95 |

| | Silica | Sodium + Chloride | | Nitrate removal from ED | Nitrate Conversion | Fresh water recovery |
|---|---|---|---|---|---|---|
| 7 | 0.5 | 1000 | | 94 | 80 | 95 |
| 8 | 1 | 2000 | | 98 | 78 | 93 |
| 9 | 2.5 | 5000 | | 89 | 71 | 95 |

Table 3 shows that for all different feed water chemistries tested, we were able to achieve freshwater recovery of 85% and higher. We were also able to achieve nitrate-to-nitrogen conversion efficiencies >75% for all feed water chemistries, the only exception being feedwaters with chloride ion concentration equal to 5000 mg/L.

Additional Terms & Definitions

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent (e.g., "widget") may also include two or more such referents.

It will also be appreciated that embodiments described herein may also include properties and/or features (e.g., ingredients, components, members, elements, parts, and/or portions) described in one or more separate embodiments and are not necessarily limited strictly to the features expressly described for that particular embodiment. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

The invention claimed is:

1. A method of removing and electro-reducing nitrate anion from a feedwater comprising nitrate solutes, the method comprising:
   providing an integrated electrodialysis and electrolysis hybrid system that includes
   a first electrode,
   a second electrode disposed opposite the first electrode, and
   an anion exchange membrane adjacent to the first electrode and a cation exchange membrane adjacent to the second electrode and between the first and second electrodes to define (i) a feedwater compartment between the respective membranes, (ii) an anion concentration compartment adjacent to the anion exchange membrane, said anion exchange membrane and first electrode defining the anion concentration compartment therebetween, and (iii) a cation concentration compartment adjacent to the cation exchange membrane, said cation exchange membrane and second electrode defining the cation concentration compartment therebetween, and
   wherein said first electrode is comprised of a planar electrically conductive material capable of operating as an electrodialysis electrode when operated as an anode and as a catalytically electro-reductive electrode capable of selectively electro-reducing nitrate anion transferred from the feedwater when operated as a cathode; and
   wherein said first electrode is the only electrode adjacent to or in direct contact with the anion concentration compartment;
   passing the feedwater into the feedwater compartment and providing water to the anion and the cation concentration compartments, and operating the hybrid system for a first time period in an electrodialysis mode by imposing an anodic polarity across the first electrode and a cathodic polarity across the second electrode to produce a concentration of nitrate ion in the feedwater compartment that is lower than the incoming feedwater, and producing a water in the anion concentration compartment that includes the nitrate anions passing through the anion exchange membrane and operating the hybrid system, for a second time period, in an electrolysis mode by reversing the polarity across the first and second electrodes, such that the first electrode becomes cathodic with respect to the second electrode, and whereby the nitrate in the anion concentration compartment is electro-reduced such that the Faradaic efficiency for conversion of nitrate to nitrite is higher than the Faradaic efficiency for conversion of nitrate to nitrogen gas.

2. The method of claim 1 wherein the first electrode comprises a nanoparticulate catalyst coating.

3. The method of claim 1 or 2 wherein the first electrode comprises a copper catalyst.

\* \* \* \* \*